United States Patent [19]

Sugahara et al.

[11] Patent Number: 5,790,215
[45] Date of Patent: Aug. 4, 1998

[54] LIQUID CRYSTAL DISPLAY DEVICE

[75] Inventors: Atsushi Sugahara; Norihiko Kamiura; Yutaka Nakai, all of Yokohama; Katsuyuki Naito, Tokyo; Kohei Suzuki, Yokohama, all of Japan

[73] Assignee: Kabushiki Kaisha Toshiba, Kawasaki, Japan

[21] Appl. No.: 614,500

[22] Filed: Mar. 13, 1996

[30] Foreign Application Priority Data

Mar. 15, 1995 [JP] Japan .................. 7-056086

[51] Int. Cl.$^6$ .................. G02F 1/1347; G02F 1/1333
[52] U.S. Cl. .................. 349/74; 349/89; 349/111
[58] Field of Search .................. 349/74, 77, 79, 349/86, 89, 110, 111

[56] References Cited

U.S. PATENT DOCUMENTS

| 4,556,286 | 12/1985 | Uchida et al. | 349/79 |
|---|---|---|---|
| 5,208,686 | 5/1993 | Fergason | 349/79 |
| 5,303,073 | 4/1994 | Shirota et al. | 349/74 |
| 5,342,545 | 8/1994 | Yamada et al. | 349/77 |
| 5,452,113 | 9/1995 | Ikeno | 349/77 |
| 5,508,831 | 4/1996 | Nakamura et al. | 349/74 |
| 5,523,188 | 6/1996 | Choi | 349/74 |
| 5,625,474 | 4/1997 | Aomori et al. | 349/79 |
| 5,629,783 | 5/1997 | Kanbara et al. | 349/89 |
| 5,708,486 | 1/1998 | Miyawaki et al. | 349/111 |

FOREIGN PATENT DOCUMENTS

| 60-169827 | 9/1985 | Japan | 349/79 |
|---|---|---|---|
| 6-337643 | 12/1994 | Japan . | |

*Primary Examiner*—William L. Sikes
*Assistant Examiner*—Tiep H Nguyen
*Attorney, Agent, or Firm*—Oblon, Spivak, McClelland, Maier & Neustadt, P.C.

[57] ABSTRACT

This invention is a liquid crystal display device including a reflecting plate formed above a substrate, and a liquid crystal cell formed by alternately, repeatedly stacking a liquid crystal layer and a transparent electrode layer at least once on the reflecting plate, wherein the liquid crystal layer includes a thin film constituted by a microcapsulated guest-host liquid crystal containing dye molecules and liquid crystal molecules.

39 Claims, 13 Drawing Sheets

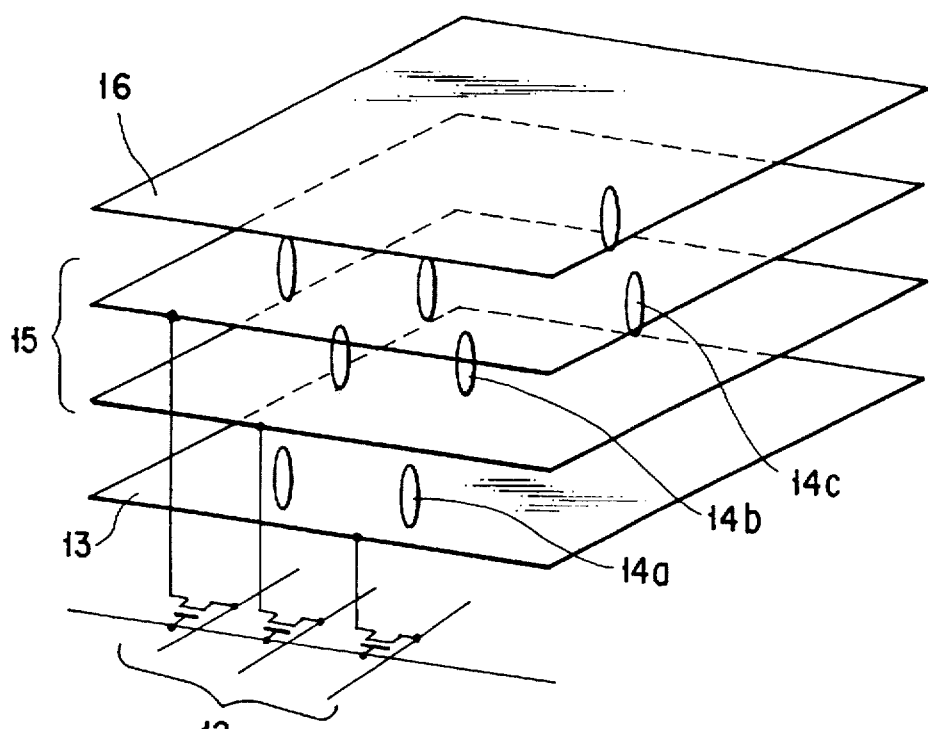
F I G. 4A
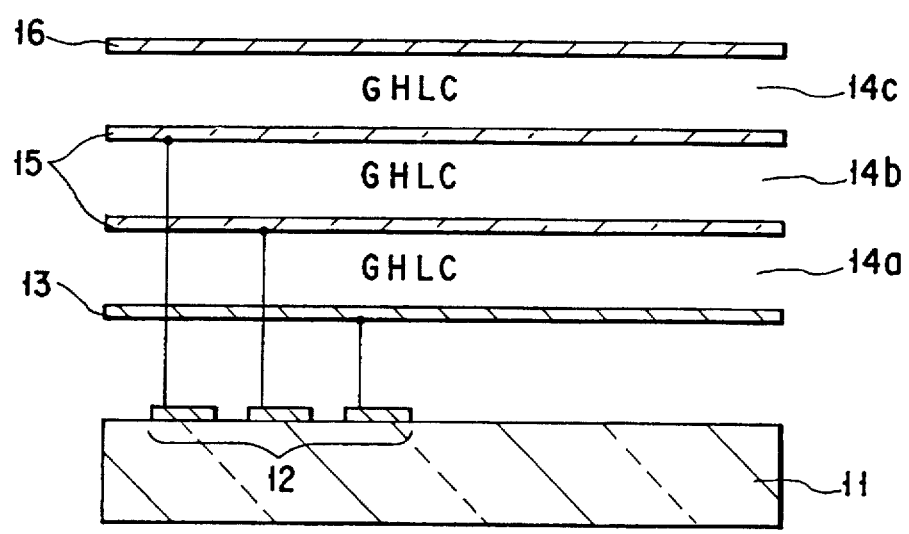
F I G. 4B ( 0 : LONG AXES OF LIQUID CRYSTAL MOLECULES AND DYE MOLECULES ARE PERPENDICULAR TO ELECTRODE SURFACE

✻ : LIQUID CRYSTAL MOLECULES AND DYE MOLECULES POINT IN ALL DIRECTIONS )

{ 0 : LONG AXES OF LIQUID CRYSTAL MOLECULES AND DYE MOLECULES ARE PERPENDICULAR TO ELECTRODE SURFACE

✗ : LONG AXES OF ABOUT HALVES OF LIQUID CRYSTAL MOLECULES AND DYE MOLECULES ARE PERPENDICULAR TO ELECTRODE SURFACE }

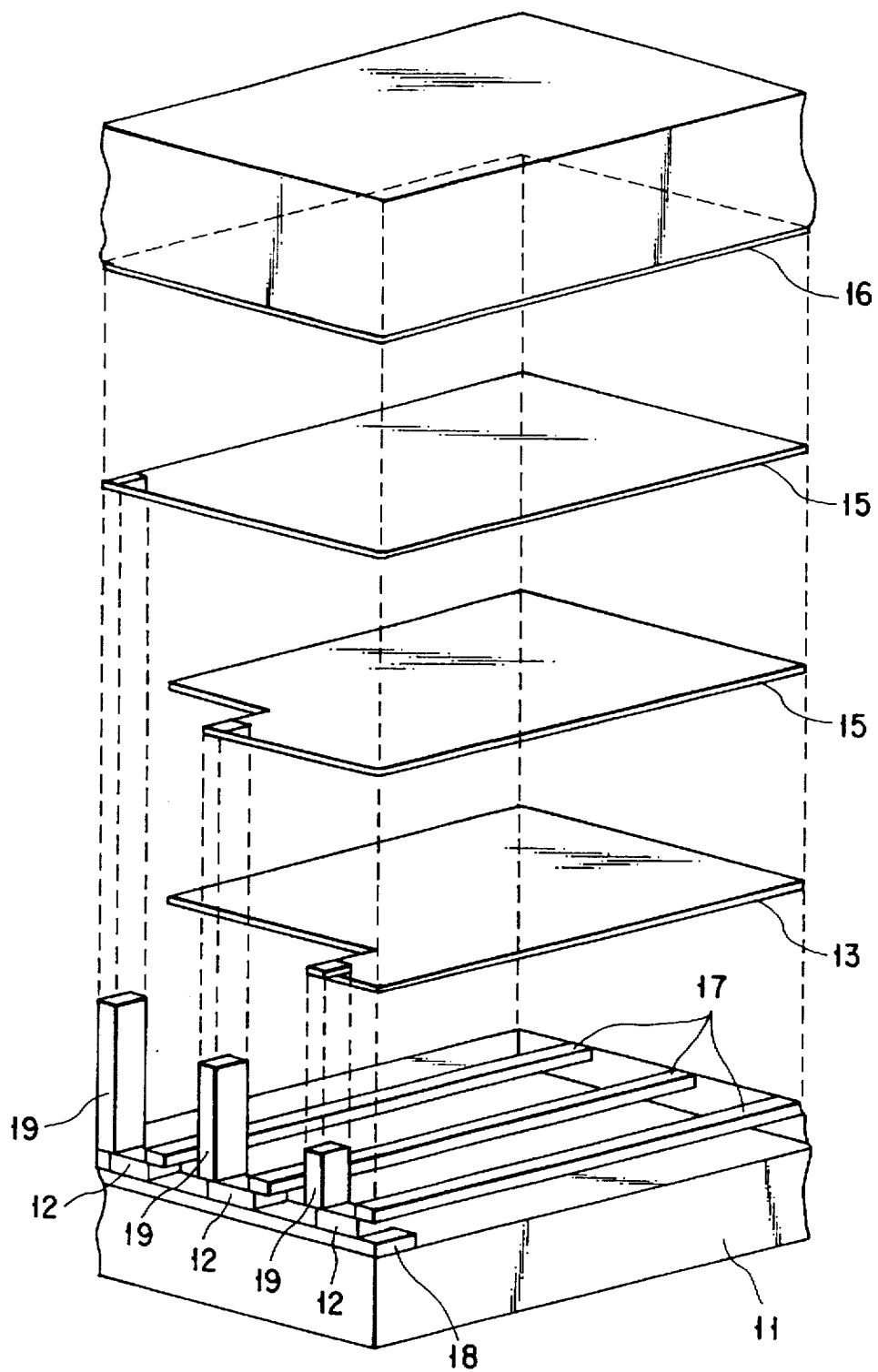
F I G. 7

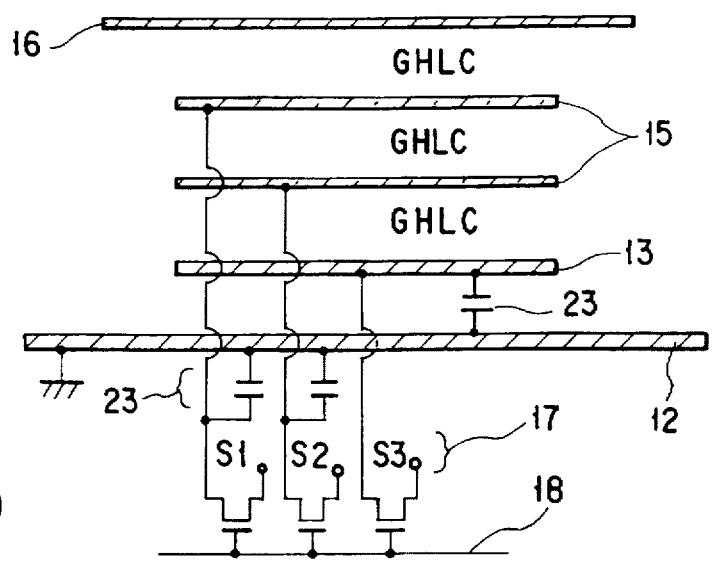
F I G. 10
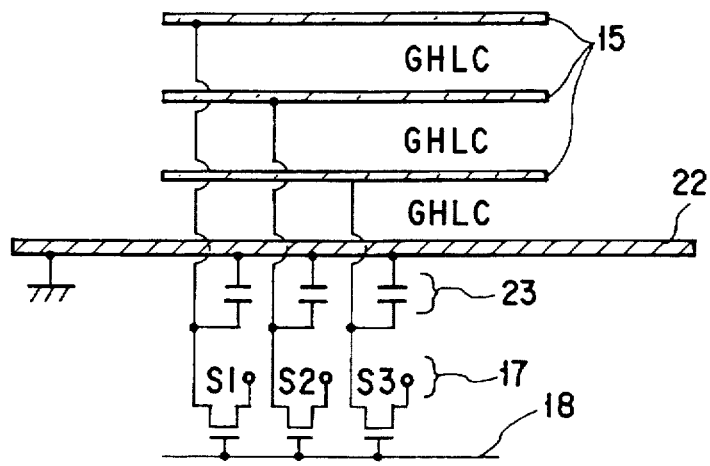
F I G. 11
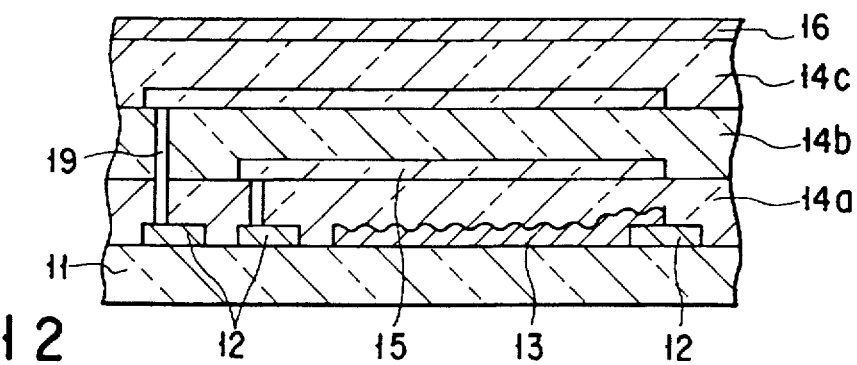
F I G. 12

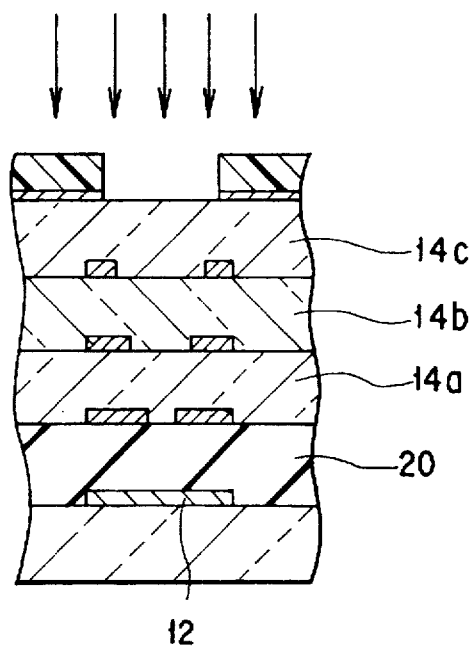
F I G. 15A
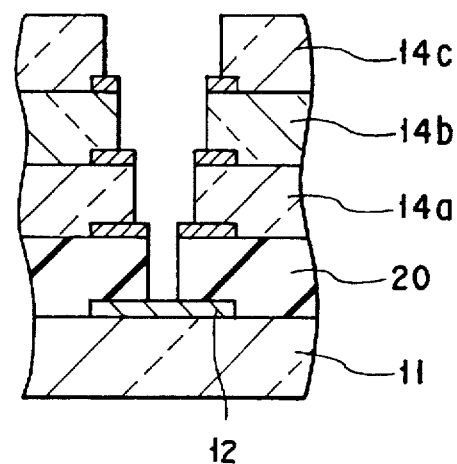
F I G. 15B
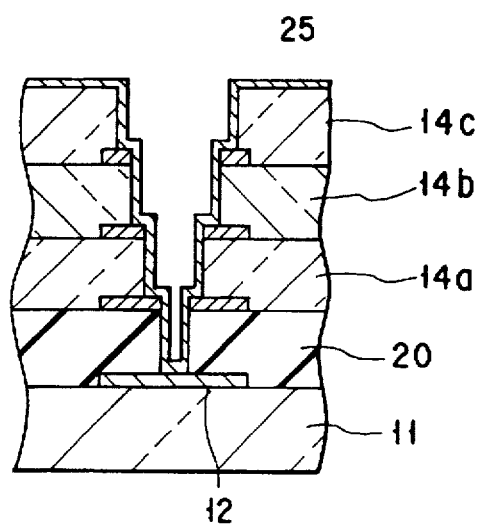
F I G. 15C

LIQUID CRYSTAL DISPLAY DEVICE

BACKGROUND OF THE INVENTION

1. Field of the Invention

The present invention relates to a liquid crystal display device and, more particularly, to a reflective liquid crystal display device.

2. Description of the Related Art

The portability is regarded as important in display devices of OA apparatuses such as personal computers, wordprocessors, and EWS (Engineering Work Station); display devices of pocket calculators, electronic books, electronic notebooks, and PDA (Personal Digital Assistant); and display devices of portable television sets, portable telephones, and portable facsimiles. Since these display devices must be driven with batteries, it is desirable that their consumption power be low. Liquid crystal display devices (LCDs), plasma displays, and flat CRTs are known as thin display devices. Among other display devices, liquid crystal display devices are best suited to the requirement of low consumption power and hence are put into practical use.

Of liquid crystal display devices, display devices whose display screen is directly viewed are called direct viewing liquid crystal display devices. The direct viewing liquid crystal display devices are classified into transmission liquid crystal display devices in which a light source such as a fluorescent lamp is incorporated into the rear surface side and reflection liquid crystal display devices which use ambient light. The transmissive liquid crystal display devices are unsuited for the purpose of decreasing the consumption power, since the devices require a back light. That is, a back light consumes a power of 1 W or more and hence can be used only for two to three hours when driven with a battery. Accordingly, the reflective liquid crystal display devices are most popular as displays of portable information apparatuses.

In the reflective liquid crystal display devices, a reflecting plate with a satin-finished surface, a polarizing plate, and an aluminum-foil reflecting plate are stacked and adhered to a rear glass substrate. The reflective liquid crystal display devices with this structure do not emit light and therefore do not consume a large power. However, the conventional reflective liquid crystal display devices cannot display bright paper white and hence necessarily cannot display vivid colors. This is a serious technical problem to be solved in developing a reflective liquid crystal display device having image quality comparable to that of the transmissive liquid crystal display devices.

An ECB (Electrically Controlled Birefringence) mode, a GH (Guest Host) mode, and a TN (Twisted Nematic) mode, for example, are used in the reflective liquid crystal display devices. A polarizing plate is necessary when the ECB mode or the TN mode is used. Since the light transmittance of a polarizing plate is about 40%, the light utilization lowers when a polarizing plate is used.

The brightness of a reflective liquid crystal display device is evaluated by its reflectance. Commonly, the reflectance is measured by integrating diffused reflected light by an integrating sphere and represented by the ratio (%) of light reflected by a liquid crystal display device to light entering the display device. For example, the reflectance of newspaper is about 60%, the reflectance of wood free paper is about 80%, and the reflectance of a powder such as magnesium oxide or barium sulfate is 99% or higher. As described above, a polarizing plate is used when the ECB mode or the TN mode is used, so a reflectance of 40% or more cannot be expected. Therefore, a reflectance of 60% or more which may be called a paper white display cannot be obtained, and this is a problem in the performance of a color display.

For the reason described above, the GH mode which requires no polarizing plate is most promising in respect of the light utilization. To perform a color display by the GH mode, it is necessary to use a stacked structure of three GH cells containing cyan, magenta, and yellow dyes. Generally, the use of this stacked structure is most preferable to realize a color display over a broad color reproduction range in the reflective liquid crystal display devices. An RGB parallel arrangement as shown in FIG. 1A or a cyan/magenta/yellow parallel arrangement as shown in FIG. 1B cannot display the same color on the entire screen, so the color reproduction range necessarily narrows in these arrangements.

To display a dot matrix by using the GH cell three-layered structure described above, it is necessary to transmit image information in units of pixels. Simple matrix driving and active matrix driving are usable as the method of matrix driving in units of pixels. The simple matrix driving requires steepness in the V-T (Voltage-Transmittance) characteristic and hence is not well suited to a GH liquid crystal whose liquid crystal content is small due to mixing of dyes. The active matrix driving includes an MIM method in which the active element is a diode and a TFT method in which the active element is a transistor.

As illustrated in FIG. 2, the TFT method usually requires signal lines 2 and scanning lines 3 connected to TFTs 1. Additionally, since the signal lines 2 and the scanning lines 3 are non-display regions, certain spacings are required between the pixel electrode and these lines. Also, a black matrix is necessary to cover these non-display regions, and this black matrix is so formed as to overlap the pixel electrode by taking account of a misalignment from the pixel electrode. Accordingly, in the TFT method the effective display region is narrowed, i.e., the opening ratio is decreased in most cases. As a consequence, the light utilization decreases to decrease the reflection luminance, resulting in a dark screen.

When a GH cell with a three-layered structure is manufactured by stacking four glass substrates 4 as shown in FIG. 3, the effective viewing angle is narrowed by the thickness (usually 0.3 mm or more) of the glass substrate 4. Furthermore, the structure in FIG. 3 includes a total of six transparent electrodes as pixel electrodes 5 and counter electrodes 6.

Accordingly, while incident light is reflected by a reflecting plate (electrode) 7 and output from the GH cell, the light must pass through these transparent electrodes a total of 12 times. Consequently, the light attenuates during the passage and this decreases the reflectance. Therefore, it is being required to decrease the number of transparent electrodes as small as possible.

SUMMARY OF THE INVENTION

The present invention has been made in consideration of the above situation and has as its object to provide a reflection liquid crystal display device having a high reflectance and a high opening ratio and capable of performing a good color display.

The present invention provides a liquid crystal display device comprising a reflecting plate provided above a substrate, and a liquid crystal cell formed by repetitively, sequentially stacking a liquid crystal layer and a transparent electrode layer at least once on the reflecting plate, wherein the liquid crystal layer includes a thin film constituted by a guest-host liquid crystal containing dye molecules and liquid crystal molecules.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4A is a schematic view showing one embodiment of the liquid crystal display device of the present invention;

FIG. 4B is a sectional view of the liquid crystal display device shown in FIG. 4A;

FIG. 7 is a perspective exploded view showing a region corresponding to one pixel in the liquid crystal display device of the present invention;

FIGS. 10 to 12 are schematic views showing other embodiments of the liquid crystal display device of the present invention;

FIGS. 15A to 15C are sectional views for explaining the manufacturing steps of still another embodiment of the liquid crystal display device of the present invention.

DETAILED DESCRIPTION OF THE PREFERRED EMBODIMENTS

Figure 1A:
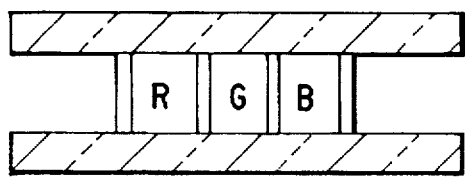
FIGS. 1A and 1B are schematic views showing conventional parallel-arrangement type liquid crystal display devices.
Figure 1B:
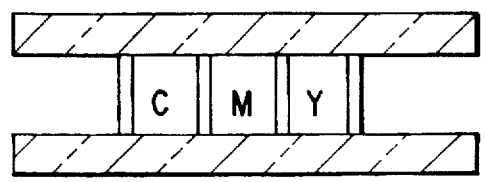
Figure 2:
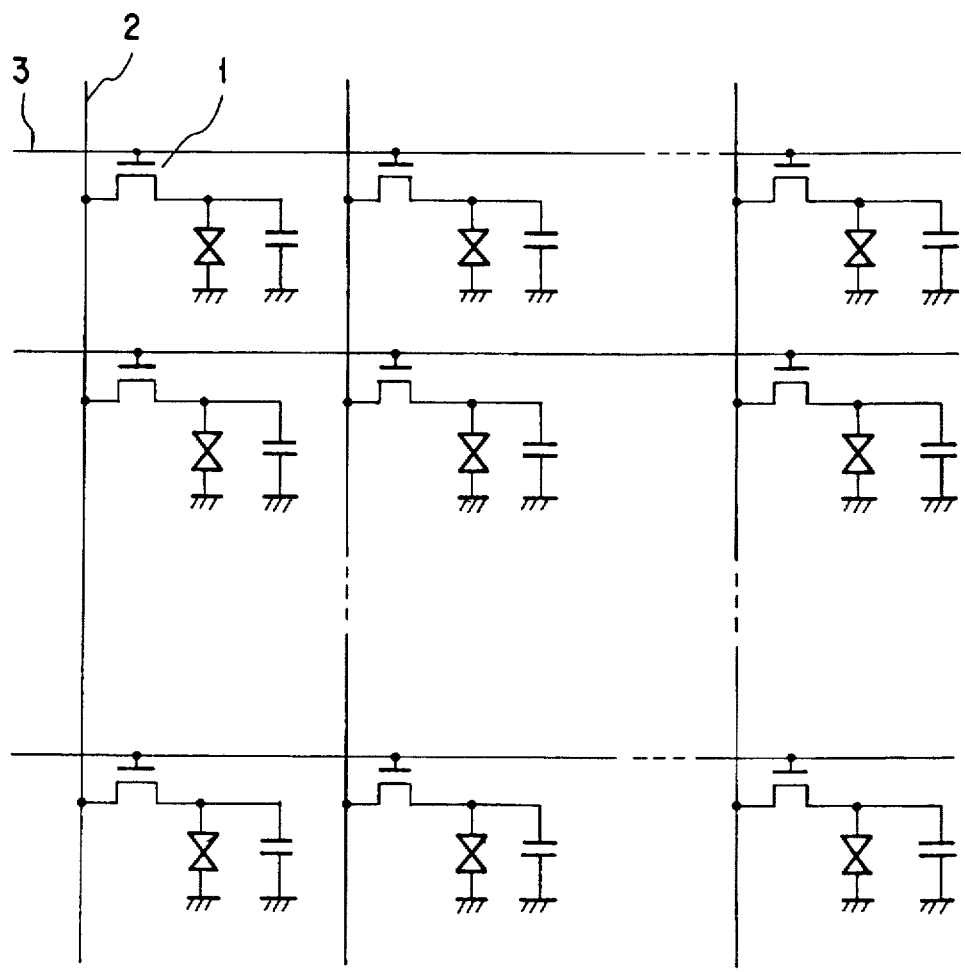
FIG. 2 is a circuit diagram showing a display region of a conventional liquid crystal display device.
Figure 3:
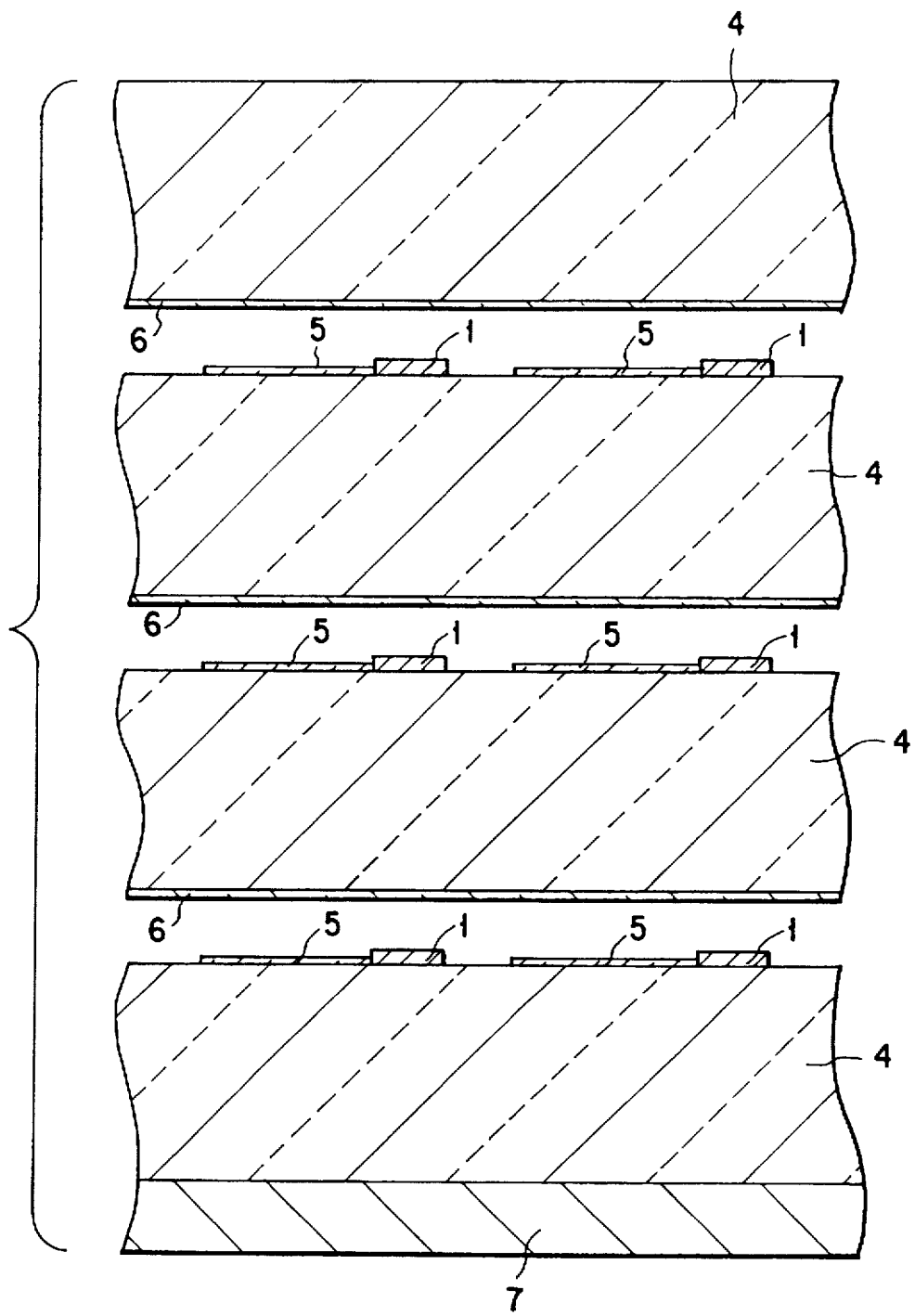
FIG. 3 is a schematic view showing a conventional guest-host liquid crystal display device with a three-layered structure.

A liquid crystal display device of the present invention is characterized by comprising a reflecting plate provided above a substrate, and a liquid crystal cell formed by alternately and repeatedly stacking a plurality of liquid crystal layers and a plurality of transparent electrode layers on said reflecting plate, wherein an active element and a wiring serving to control a potential information which is to be given to all the transparent electrodes are formed on the substrate such that each transparent electrode layer and the active element are electrically connected to each other.

A liquid crystal display device of the present invention is characterized by comprising a reflecting plate provided above a substrate, and a liquid crystal cell formed by alternately, repetitively stacking a liquid crystal layer and a transparent electrode layer at least once on the reflecting plate, wherein the liquid crystal layer includes a thin film made of a microcapsulated guest-host liquid crystal containing dye molecules and liquid crystal molecules.

In the liquid crystal display device of the present invention, the liquid crystal layer is made from a thin film containing microcapsules encapsulating a liquid crystal material. Accordingly, this thin film can be readily stacked. This eliminates the need for a glass substrate between the liquid crystal layers and minimizes the number of ITO films. Consequently, the effective viewing angle is widened.

In this liquid crystal display device, a liquid crystal cell region is preferably separated from an active element region and an interconnecting or wiring region by the reflecting plate. Consequently, the active element region and the interconnecting region which are non-display regions do not exist in the liquid crystal cell region, and this increases the opening ratio. Also, in conventional liquid crystal displays the number of transparent electrodes is as large as (pixel electrodes+counter electrodes)×the number of liquid crystal layers (e.g., if the number of liquid crystal layers is three, the number of transparent electrodes is six). In the present invention, however, in the liquid crystal cell region the number of transparent electrodes can be decreased to pixel electrodes×the number of liquid crystal layers (e.g., if the number of liquid crystal layers is three, the number of transparent electrodes is three). This improves the transmittance compared to that in the conventional liquid crystal display devices.

Furthermore, since the liquid crystal display device of the present invention uses a guest-host liquid crystal, the display device does not require a polarizing plate. This increases the light utilization, and the reflectance also can be increased. Unlike a polymer dispersed liquid crystal which scatters and transmits light by using a mismatch between refractive indices, in the case of the guest-host liquid crystal color mixing is readily possible by stacking liquid crystal layers. This broadens the color reproduction range and makes a good color display possible.

In the liquid crystal display device of the present invention, the liquid cell is formed by repetitively, sequentially stacking a liquid crystal layer and a transparent electrode layer at least once. This liquid crystal cell can be formed by pouring a liquid crystal material between a plurality of glass substrates each having a transparent electrode layer or by alternately forming liquid crystal layers and transparent electrode layers. Alternatively, a polymer film having a transparent electrode layer or a transparent insulating layer formed on the surface is used as an intermediate substrate in forming the liquid crystal cell. In this case, a liquid crystal material is poured into a free space between adjacent intermediate substrates so as to prepare the liquid crystal cell.

To form the liquid crystal cell by alternately forming liquid crystal layers and transparent electrode layers, microcapsules encapsulating a liquid crystal material are mixed in a solvent to prepare a paste, a base is coated with the paste, and the solvent is volatilized to form a thin film containing the microcapsules. A transparent conductive material, such as ITO (Indium Tin Oxide) or tin oxide, is deposited on the thin film by sputtering or printing and patterned to form a transparent electrode layer. This operation is repeated to form a liquid crystal cell consisting of a plurality of pairs of the transparent electrode layers and the thin films. Note that the diameter of the microcapsules must be set to be equal to or smaller than the cell gap. Examples of usable microcapsulation techniques are interfacial polymerization, in-situ polymerization, submerged hardening coating, phase separation from an aqueous solution system, phase separation from an organic solvent system, melt dispersion cooling, air suspension, and spray drying. It is possible to appropriately select any of these methods in accordance with the purpose and the form. As the microcapsulating agent (film material), it is possible to use addition polymers such as polystyrene, a styrene-divinylbenzene copolymer, methyl polymethacrylate, polyacrylonitrile, polybutadiene, polyisoprene, and polytetrafluoroethylene; polycondensation polymers such as polyamides, e.g., Nylon 66, polyimides, polyurethanes, polyesters, and polyetherimides; and natural polymers such as gum arabic, gelatin, natural rubber, and cellulose. The microcapsule film material is desirably a three-dimensionally crosslinked material with a high heat resistance. A binder necessary in the formation of microcapsules is not particularly limited. However, the binder must be soluble in an appropriate solvent to stably disperse microcapsules before the film formation. It is desirable that a binder polymer be crosslinkable to be rendered insoluble by, e.g., application of heat after the film formation. The thickness of the thin film (liquid crystal layer) is preferably 5 to 15 μm. If the thickness of the thin film is smaller than 5 μm, no sufficient color density can be obtained. If the thickness of the thin film is larger than 15 μm, the applied voltage increases and this makes driving by active elements impossible.

With the above structure, it is no longer necessary to poure a liquid crystal material and use a glass substrate. Consequently, the thickness of the liquid crystal display device itself can be decreased, and the effective viewing angle can be widened. Also, since the liquid crystal layers and the transparent electrode layers are formed by thin films, these layers can be easily patterned, and this enables the formation of through holes by patterning. Accordingly, it is readily possible to form electrical connections between active elements formed on the substrate and the individual transparent electrode layers.

In the liquid crystal display device of the present invention, it is preferable that three transparent electrode layers and three liquid crystal layers be stacked on a reflecting plate and the colors of these liquid crystal layers correspond to cyan, magenta, and yellow. With this arrangement a color display can be performed. It is also preferable that four transparent electrode layers and four liquid crystal layers be stacked on a reflecting plate and the colors of these films correspond to cyan, magenta, yellow, and black. By the formation of this black liquid crystal layer it is possible to display coloration-free black, i.e., sharp black.

In the liquid crystal display device of the present invention, it is preferable that the transparent electrode layers and the active elements be electrically connected via plating layers. It is also preferable that a shield electrode of a fixed potential be formed between the substrate and the reflecting plate. By the formation of this shield electrode it is possible to prevent electrical coupling noise between signal lines and pixels and coupling noise between scanning lines or active elements and pixels. The reflecting plate can also be used as an electrode which also functions as the shield electrode. With this structure it is possible to decrease one electrode and hence the number of manufacturing steps.

In the liquid crystal display device of the present invention, a glass substrate or the like can be used as the substrate material. However, the substrate need not be transparent because the reflecting plate is arranged between the substrate and the liquid crystal cell. Therefore, a substrate made from silicon or ceramics also can be used. Examples of a conductive reflecting plate material are aluminum and chromium, and examples of an insulating reflecting plate material are magnesium oxide and barium sulfate. The guest dye molecules are added to the liquid crystal by using dyes such as yellow dyes represented by Formulas (1) to (9) below, magenta dyes represented by Formulas (10) to (17) below, and cyan dyes represented by Formulas (18) to (21) below.

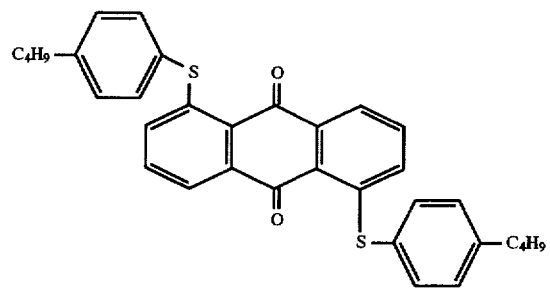

(1)

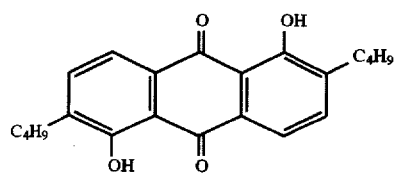

(2)

-continued
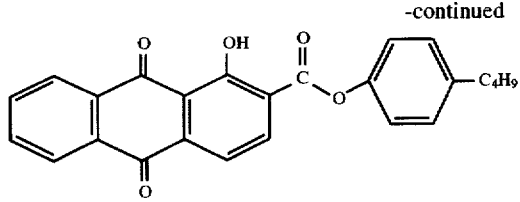
(3)
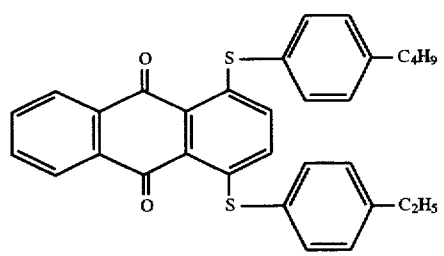
(4)
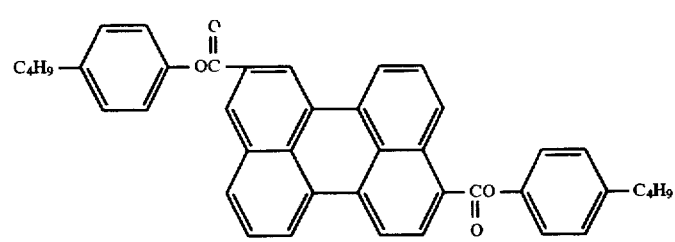
(5)
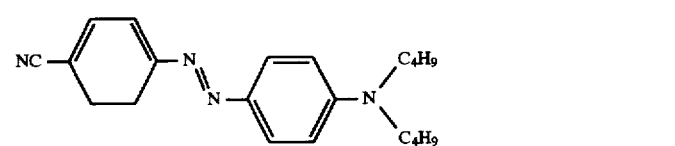
(6)
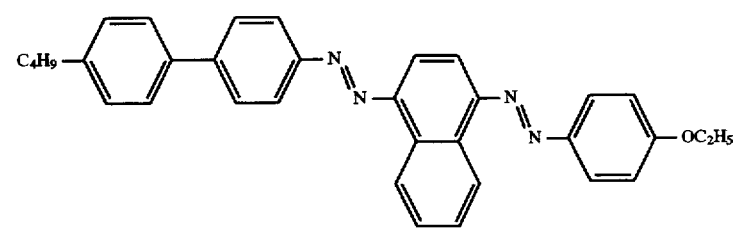
(7)
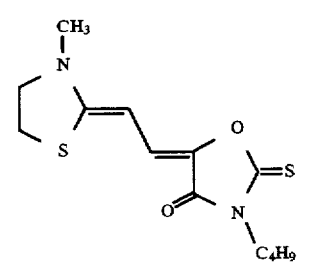
(8)
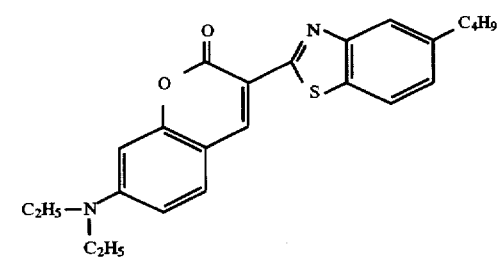
(9)

-continued
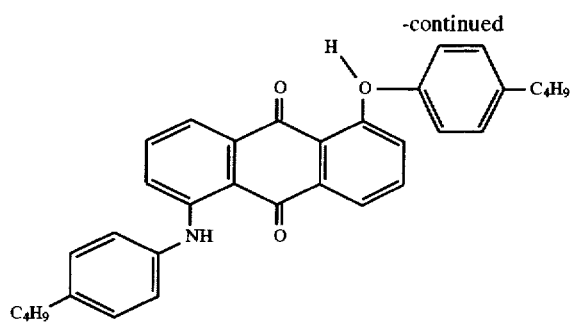
(10)
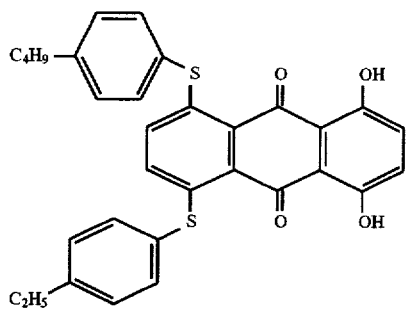
(11)
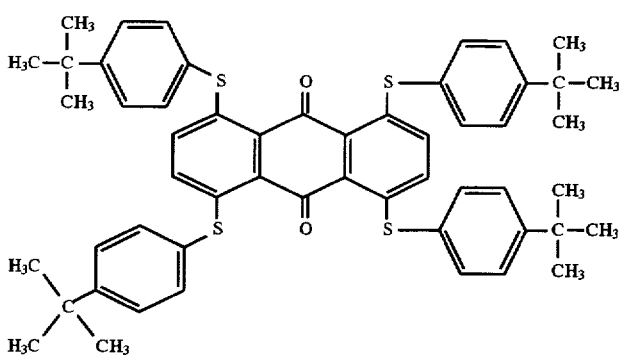
(12)
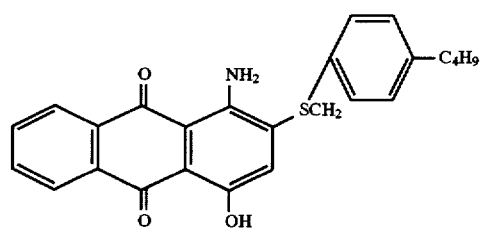
(13)
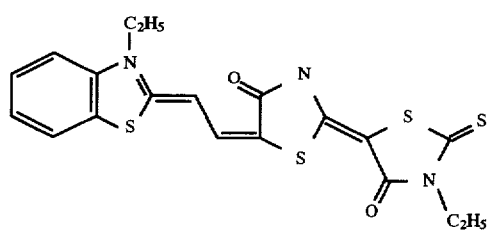
(14)
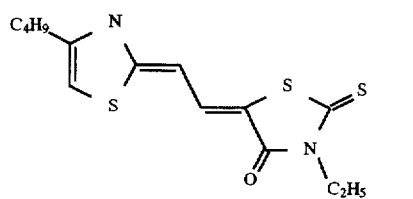
(15)

-continued
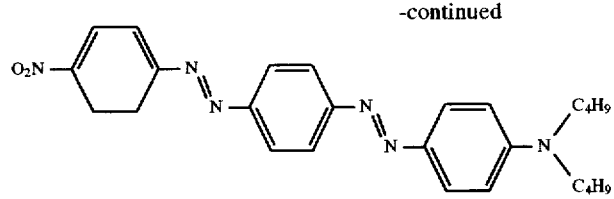
(16)
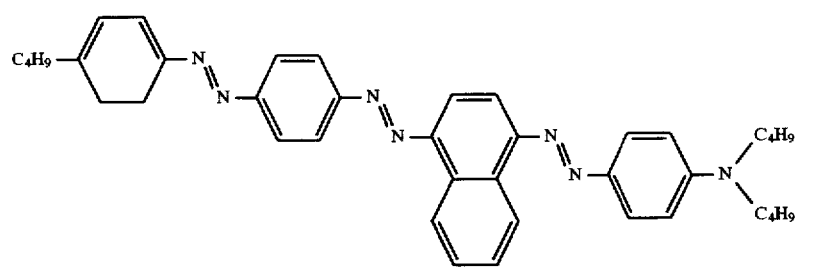
(17)
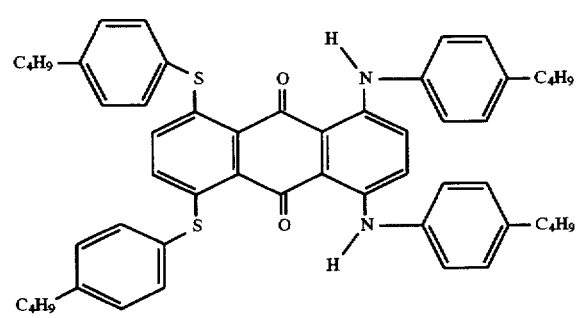
(18)
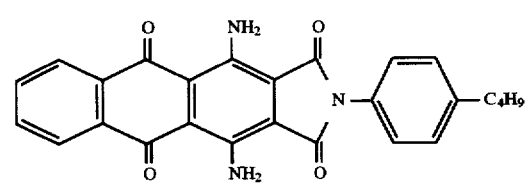
(19)
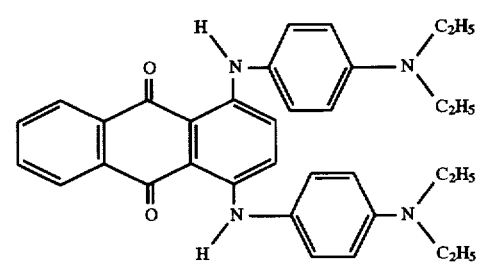
(20)
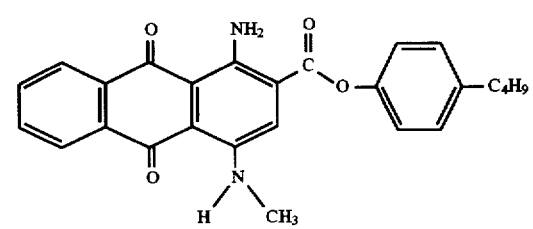
(21)
As the host liquid crystal, it is possible to use compounds represented by Formulas (22) to (31) below and their mixtures.
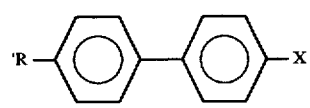
(22)
-continued
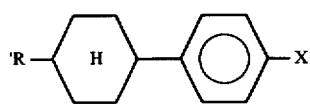
(23)

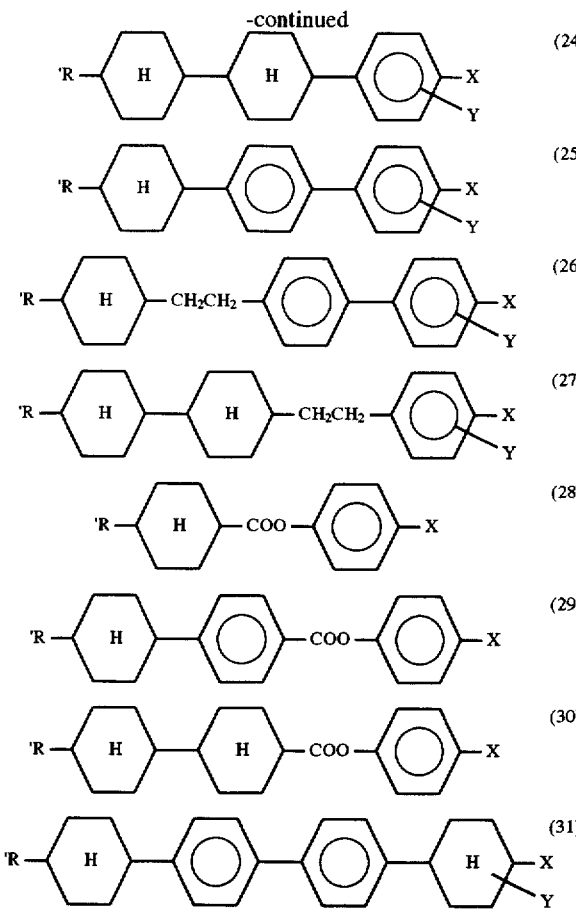

wherein R' and X independently represent an alkyl group, an alkoxy group, an alkylphenyl group, an alkoxyalkylphenyl group, an alkoxyphenyl group, an alkylcyclohexyl group, an alkoxyalkylcyclohexyl group, an alkylcyclohexylphenyl group, a cyanophenyl group, a cyano group, a halogen atom, a fluoromethyl group, a fluoromethoxy group, an alkylphenylalkyl group, an alkoxyalkylphenylalkyl group, an alkoxyalkylcyclohexylalkyl group, an alkylcyclohexylalkyl group, an alkoxyalkoxycyclohexylalkyl group, an alkoxyphenylalkyl group, or an alkylcyclohexylphenylalkyl group, and Y represents a hydrogen atom or a halogen atom. These alkyl and alkoxy chains may have an optically active center. The phenyl group or the phenoxy group in R' and X may be substituted by a halogen atom such as a fluorine atom or a chlorine atom. Also, the phenyl group in each formula may be substituted by one or two halogen atoms such as fluorine atoms or chlorine atoms.

All of the liquid crystal compounds represented by the above formulas have positive dielectric anisotropy. However, any well-known liquid crystal having negative dielectric anisotropy also can be used by mixing the liquid crystal in a liquid crystal with positive dielectric anisotropy, thereby obtaining positive dielectric anisotropy as a whole. It is also possible to directly use a liquid crystal with negative dielectric anisotropy by using a proper element arrangement and a proper driving method.

The active element means, e.g., a TFT (thin-film transistor) or an MIM (metal-insulator-metal), and the interconnecting region means signal lines (data lines) and scanning lines (address lines).

Embodiments of the present invention will be described in detail below with reference to the accompanying drawings.

Embodiment 1

FIG. 4A is a schematic view showing one embodiment of the liquid crystal display device of the present invention.

FIG. 4B is a sectional view of the liquid crystal display device shown in FIG. 4A. In FIG. 4B, reference numeral 11 denotes a glass substrate. A plurality of TFTs 12 are formed on the glass substrate 11. An aluminum reflecting plate 13 is also arranged on the glass substrate 11 via an insulating film. This reflecting plate 13 forms a pixel electrode. Additionally, a yellow liquid crystal layer 14a, a transparent electrode layer (pixel electrode) 15, a magenta liquid crystal layer 14b, another transparent electrode layer (pixel electrode) 15, and a cyan liquid crystal layer 14c are stacked in this order on the reflecting plate 13. Each of these liquid crystal layers 14a to 14c is formed by printing a paste containing microcapsules encapsulating a guest-host liquid crystal which contains dye molecules of the corresponding color (yellow, magenta, or cyan), and volatilizing the solvent in the paste. The transparent electrode layers 15 are formed by sputtering a transparent conductive material and patterning the material by photolithography and etching. Note that the stacking order of the liquid crystal layers 14a to 14c is not particularly limited.

On top of the cyan liquid crystal layer 14c, a glass substrate having a transparent counter electrode 16 is arranged. Note that each TFT is electrically connected to the reflecting plate 13 or the transparent electrode layer 15.

In the liquid crystal display device with the above structure, neither active elements nor interconnecting lines which are non-display regions are present in the liquid crystal layers 14a to 14c and the transparent electrode layers 15. This results in a high opening ratio. Additionally, the light utilization is high because the transparent electrode layers are formed by thin films without using any glass substrate.

Figure 5A:
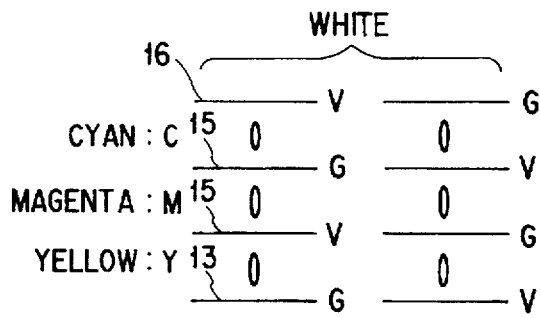
FIGS. 5A to 5H are views showing the potential arrangements of the liquid crystal display device of the present invention.

To perform a color display by using this liquid crystal display device, the voltages to be applied to the four electrodes sandwiching the liquid crystal layers are previously determined by an arithmetic circuit. To display "white", for example, the voltages are applied as illustrated in FIG. 5A. In FIG. 5A, reference symbol G means GND which is a certain reference voltage. V is a potential with respect to GND. In the V-T characteristic described earlier, V is a potential at which T can be saturated to a certain high degree. Two different applied voltages are shown in FIG. 5A because it is necessary to apply an AC waveform to the liquid crystal layers. To display "white" by using the guest-host liquid crystal, the liquid crystal molecules and the dye molecules require to raise to be as perpendicular as possible to the electrode surface, in order to transmit light. For this reason, the voltages are applied as illustrated in FIG. 5A.

Figure 5E:
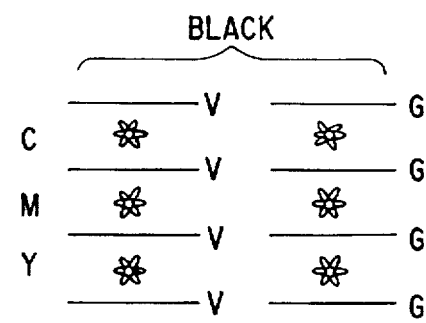

In contrast, to display "black" it is necessary to point the liquid crystal molecules and the dye molecules in all directions in order to absorb light. In the liquid crystal display device of the present invention, the liquid crystal molecules are so oriented that the directions of these molecules are scattered in all directions in the absence of an electric field. Therefore, to display "black" the voltages are applied as shown in FIG. 5E.

Figure 5B:
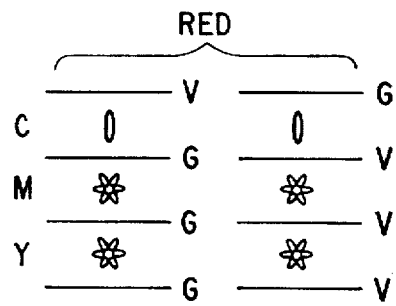

To display "red" as one primary color, as illustrated in FIG. 5B, the magenta liquid crystal layer 14b and the yellow liquid crystal layer 14a are made absorb light, and the cyan liquid crystal layer 14c is made transmit light. To display "green", as shown in FIG. 5C, the cyan liquid crystal layer 14c and the yellow liquid crystal layer 14a are made absorb light, and the magenta liquid crystal layer 14b is made transmit light. To display "blue", as shown in FIG. 5D, the cyan liquid crystal layer 14c and the magenta liquid crystal layer 14b are made absorb light, and the yellow liquid crystal layer 14a is made transmit light.

Figure 5F:
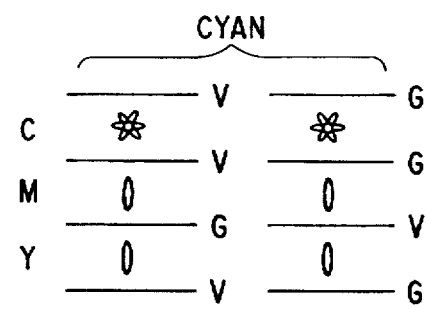
Figure 5C:
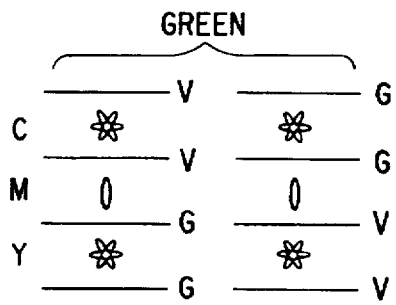
Figure 5G:
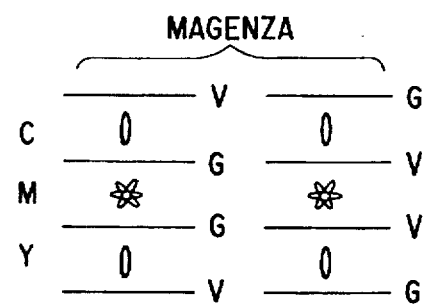
Figure 5D:
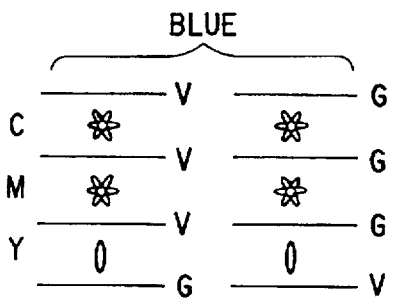
Figure 5H:
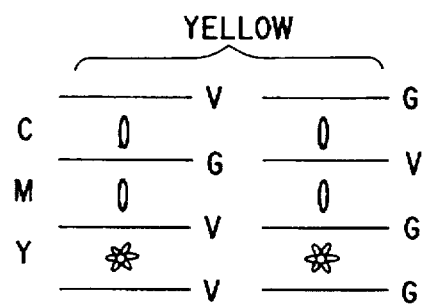

To display "cyan" as one complementary color, as illustrated in FIG. 5F, the cyan liquid crystal layer 14c is made absorb light, and the magenta liquid crystal layer 14b and the yellow liquid crystal layer 14a are made transmit light. To display "magenta", as illustrated in FIG. 5G, the magenta liquid crystal layer 14b is made absorb light, and the cyan liquid crystal layer 14c and the yellow liquid crystal layer 14a are made transmit light. To display "yellow", as shown in FIG. 5H, the yellow liquid crystal layer 14a is made absorb light, and the cyan liquid crystal layer 14c and the magenta liquid crystal layer 14b are made transmit light.

In this manner the eight fundamental colors can be displayed. In this case the potentials to be applied to the individual electrodes can be V and G. It is preferable that the transmittance or the reflectance of the liquid crystal molecules and the dye molecules in the liquid crystal layers 14a to 14c be a maximum or a minimum in the direction of incident light which are substantially perpendicular to the surface of the reflecting plate 13 or the surfaces of the transparent electrode layers 15.

Figure 6A:
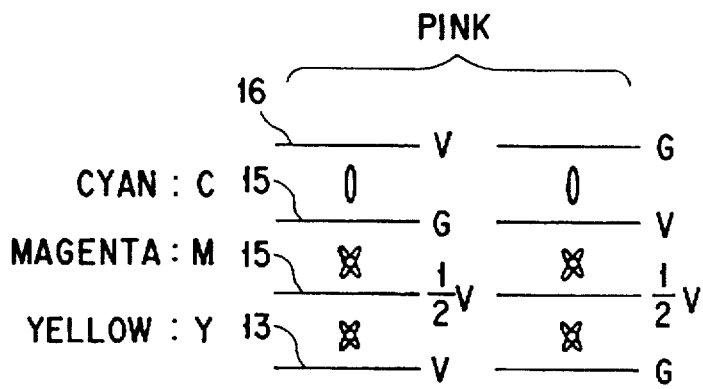
FIGS. 6A and 6B are views showing the potential arrangements of the liquid crystal display device of the present invention.
Figure 6B:
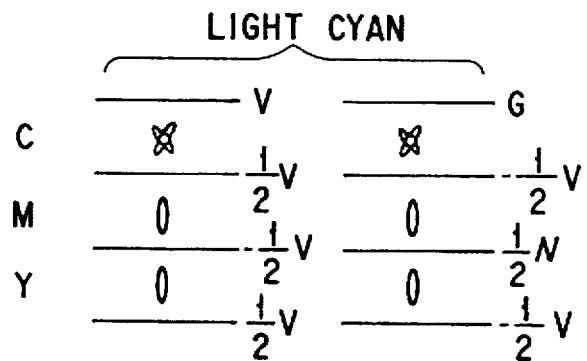

To perform a halftone display, on the other hand, it is possible to use so-called frame rate control (FRC) or a dither method using a plurality of pixels, i.e., a dot area modulation method. Gradation can also be displayed by controlling the transmittance with the voltages. That is, when the voltages are applied as shown in FIG. 6A, the cyan liquid crystal layer 14c becomes transparent, and the magenta liquid crystal layer 14b and the yellow liquid crystal layer 14a become semi-transparent. In this case "pink" can be displayed. To display "light cyan", the voltages are applied as illustrated in FIG. 6B. In such a halftone display, the range of the voltage to be applied to each electrode must be set to −V to G to +V.

A detailed structure of the liquid crystal display device of the present invention will be described below. FIG. 7 is a perspective exploded view showing a region corresponding to one pixel of the liquid crystal display device of the present invention. One scanning line 18 is formed on a glass substrate 11, and three TFTs 12 are formed to be spaced apart from each other on the scanning line 18. This is because three liquid crystal capacitances of cyan, magenta, and yellow are present in one pixel. Additionally, three signal lines 17 are formed in contact with the TFTs 12 in a direction perpendicular to the scanning line 18. A copper plating column 19 is formed on each TFT 12 in the direction of thickness. This copper plating column 19 electrically connects the TFT 12 to a reflecting plate 13 or a transparent electrode layer 15. Information sent through each signal line 17 is supplied to the reflecting plate (pixel electrode) 13 or the transparent electrode (pixel electrode) 15 via the TFT 12 and the copper plating column 19.

In the liquid crystal display device illustrated in FIG. 7, the liquid crystal layers 14a to 14c are stacked without forming any insulating layers between them. Accordingly, it is possible to decrease the number of transparent electrode layers, as counter electrodes, required for individual liquid crystal layers in a conventional structure in which insulating layers are formed between the liquid crystal layers. This simplifies the interconnecting structure of counter electrodes.

Although a storage capacitance (Cs) is not illustrated in FIG. 7, the storage capacitance Cs is actually connected in parallel with the liquid crystal capacitances of one pixel. That is, a Cs common line is arranged parallel to each scanning line 18, and the storage capacitances Cs are formed in units of pixels between the Cs common line, the signal line 18, and a "given metal electrode". This "given metal electrode" is connected to the pixel electrode through a through hole. Since three liquid crystal capacitances are present in one pixel, three storage capacitances Cs must be formed for one pixel.

A method of manufacturing the TFT array substrate shown in FIG. 7 will be described below.

First, a 1000- to 2000-Å thick silicon oxide film or silicon nitride film is formed on a glass substrate. A thin film made from a metal such as molybdenum, tantalum, tungsten, titanium, aluminum, chromium, or copper or from an alloy of these metals, or a stacked film of such thin films, is formed on top of the silicon oxide or nitride film. These thin films are patterned by so-called photolithography, i.e., a photoengraving process (PEP), thereby forming gates and gate lines of TFTs.

Subsequently, a 2000- to 4000-Å thick silicon oxide film or silicon nitride film is formed as a gate insulating film, and a 100- to 4000-Å thick i/a-Si:H layer is formed on it. A 1000- to 2000-Å thick silicon oxide film or silicon nitride film may also be formed and patterned by PEP as an etching stopper layer.

Thereafter, a 100- to 1000-Å thick $n^+$/a-Si:H layer is formed to serve as source and drain contacts of TFTs. The i/a-Si:H layer and the $n^+$/a-Si:H layer serving as channels of TFTs are patterned by PEP.

A thin film made from a metal such as aluminum, titanium, molybdenum, tantalum, or chromium or from an alloy of these metals, or a stacked film of these thin films, is formed as source-drain electrodes and signal lines. The film is patterned into a desired shape by PEP. Thereafter, the $n^+$/a-Si:H layer is removed from between the source and drain of each TFT, thereby manufacturing TFTs.

Figure 8A:
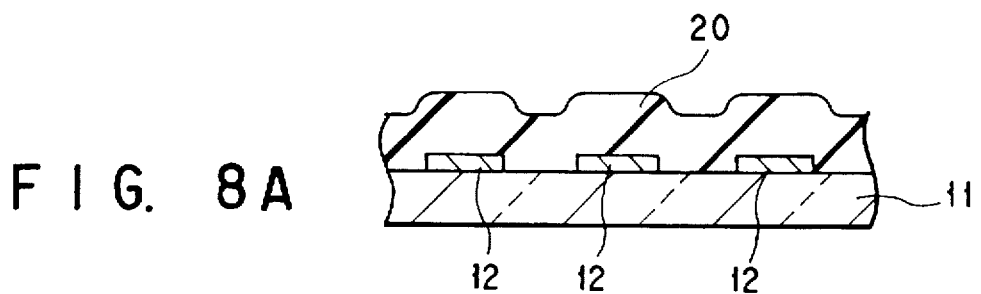
FIGS. 8A to 8J are sectional views showing the manufacturing steps of the liquid crystal display device in FIG. 7.
Figure 8B:
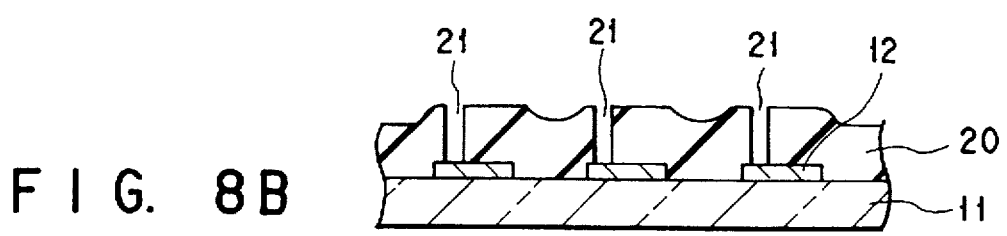

As shown in FIG. 8A, a 0.1- to 3-μm thick insulating film 20 is formed on the TFTs 12. Examples of the insulating film 20 are a silicon oxide film, a silicon nitride film, a polyimide film, a polycarbonate film, an acrylic resin film, a fluorine resin film, a polyester resin film, an epoxy resin film, and a silicone resin film. As shown in FIG. 8B, through holes 21 are formed in predetermined portions of the insulating film 20 to make contacts to the sources or drains of the TFTs 12.

Figure 8C:
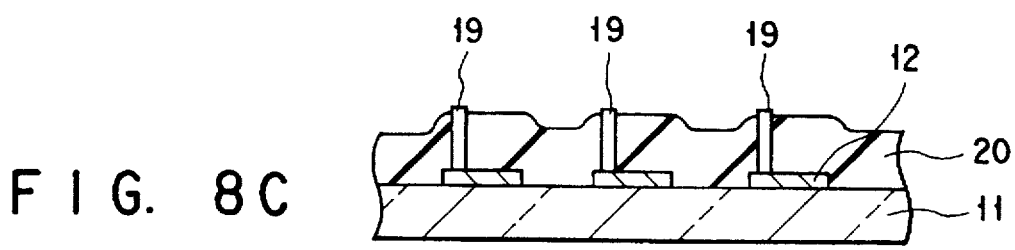
Figure 8D:
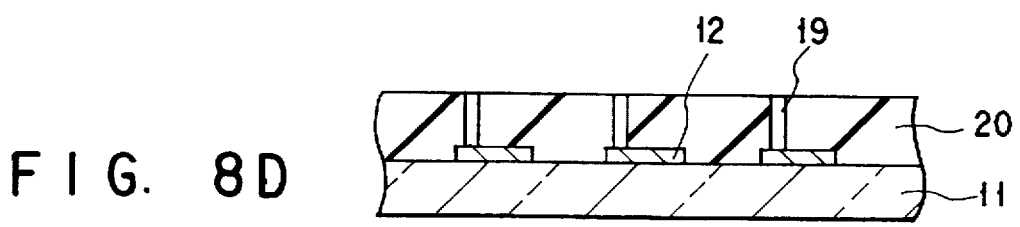
Figure 8E:
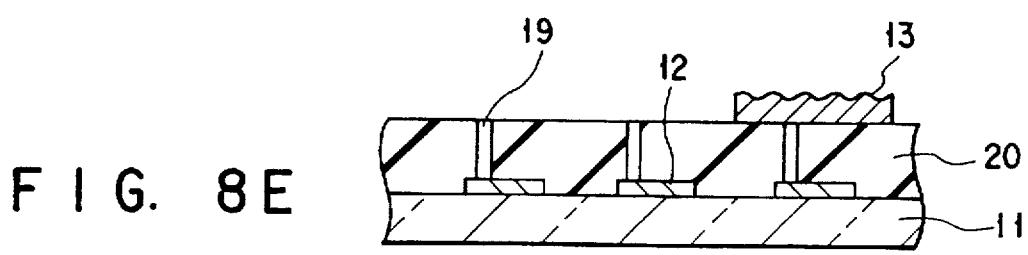

As illustrated in FIG. 8C, copper plating columns 19 are grown in these through holes 21 by a plating process. As shown in FIG. 8D, the surface is planarized by CMP (Chemical Mechanical Polishing). As shown in FIG. 8E, a 1000- to 4000-Å thick metal such as aluminum, chromium, molybdenum, or tungsten is so deposited as to contact the copper plating columns 19, forming a reflecting plate (pixel electrode) 13. To approach the reflection characteristic of this reflecting electrode to complete diffusion, it is preferable to coarsen the surface of the reflecting plate 13. Examples of a coarsening method are a method of coarsening by PEP, a press method such as emboss processing, a method of roughening the surface with chemicals, and a method of roughening the surface by using, e.g., a file. It is also possible to deposit a powder of, e.g., magnesium oxide or barium monosulfide having a complete diffusion characteristic on the reflecting plate 13.

Figure 8F:
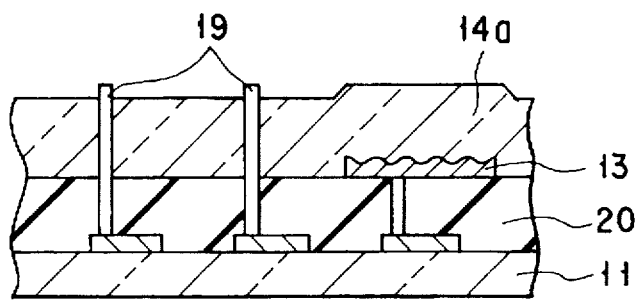

As illustrated in FIG. 8F, the surface of the resultant structure is coated with a paste containing microcapsules encapsulating a guest-host liquid crystal which contains dye molecules. The solvent or the like material in this paste is volatilized to harden the microcapsules, thereby forming a 5- to 15-μm thick yellow liquid crystal layer 14a. Through holes are formed in the yellow liquid crystal layer 14a by PEP, and the copper plating columns 19 connecting to the sources or drains are grown.

Figure 8G:
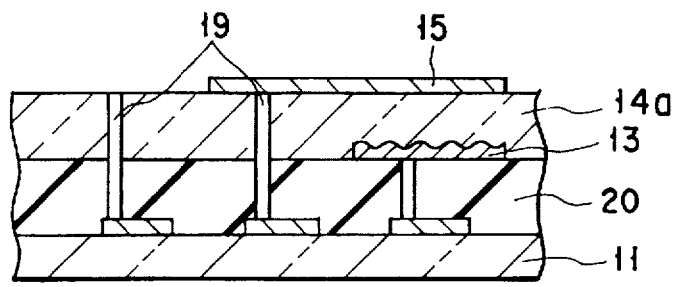
Figure 8H:
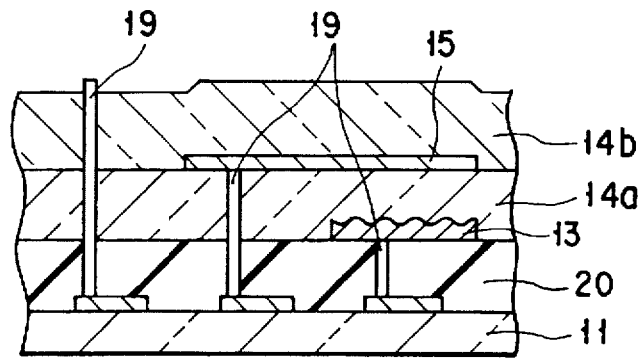
Figure 8I:
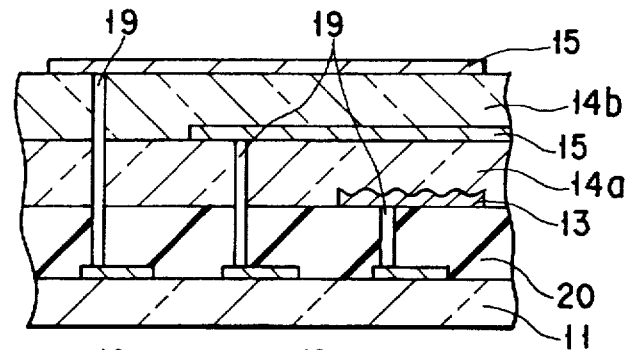
Figure 8J:
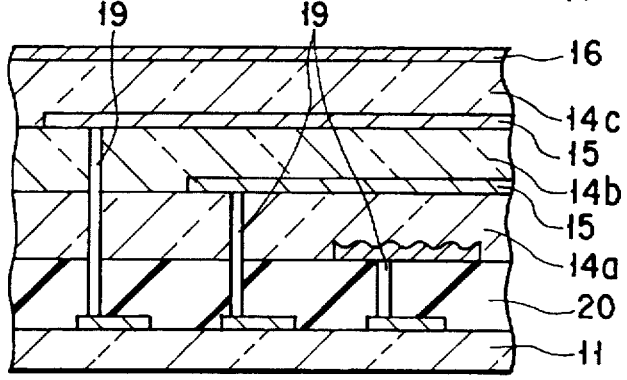

As illustrated in FIG. 8G, the surface is planarized by CMP, and a 100- to 1000-Å thick transparent electrode layer (pixel electrode) 15 is formed and patterned. As shown in FIG. 8H, as in the case of the yellow liquid crystal layer 14a, a 5- to 15-μm thick magenta liquid crystal layer 14b is formed, through holes are formed in it, and copper plating columns 19 are grown. As shown in FIG. 8I, the surface is again planarized by CMP, and another transparent electrode layer (pixel electrode) 15 is formed and patterned. Finally, as illustrated in FIG. 8J, a 5- to 15-μm thick cyan liquid crystal layer 14c is formed in the same way as for the yellow liquid crystal layer 14a, and a glass substrate having a transparent counter electrode 16 is placed on the layer 14c so that the counter electrode 16 is in contact with the layer 14c.

Figure 9A:
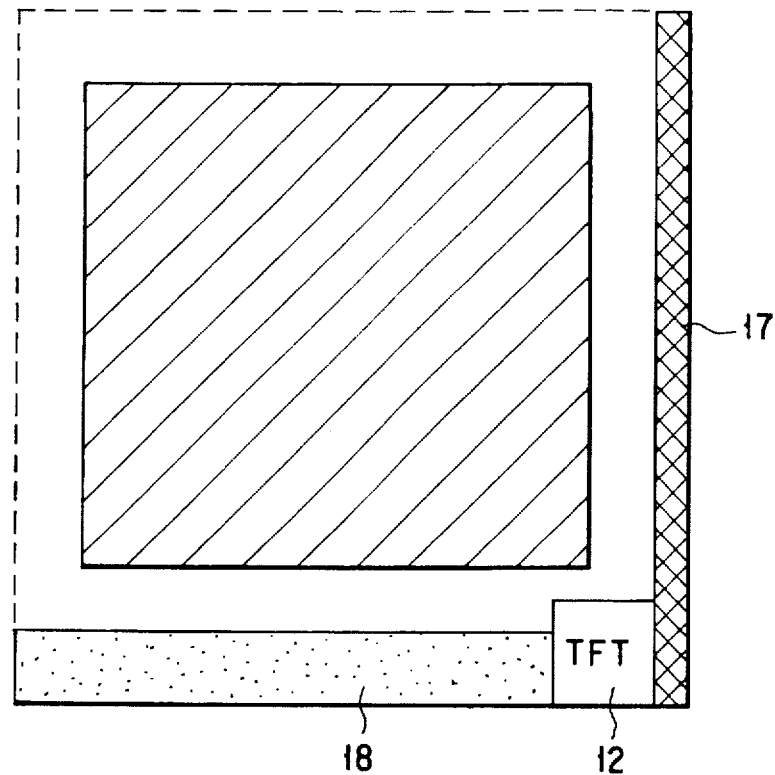
FIG. 9A is a plan view for explaining the opening ratio of a conventional liquid crystal display device.
Figure 9B:
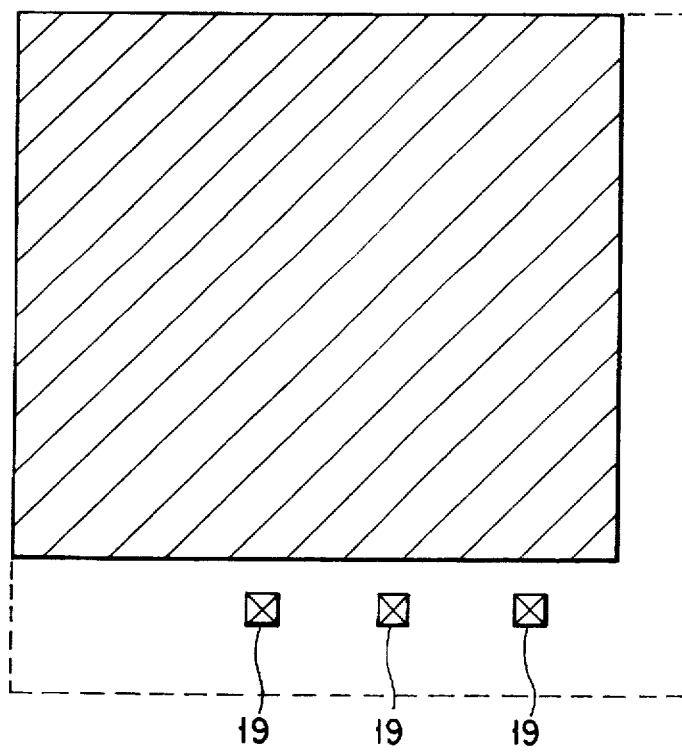
FIG. 9B is a plan view for explaining the opening ratio of the liquid crystal display device of the present invention.

The opening ratio (effective display region) in one pixel of the manufactured liquid crystal display device having a pixel pitch of a 100-μm side square was compared with that of a conventional liquid crystal display device. The results are shown in FIGS. 9A and 9B. FIG. 9A is a plan view showing a pixel region of the conventional liquid crystal display device. FIG. 9B is a plan view showing a pixel region of the liquid crystal display device of the present invention. In the conventional liquid crystal display device, as shown in FIG. 9A, the TFT 12, the signal line 17, and the scanning line 18 were non-display regions, and it was necessary to stack four glass substrates. As a result, the opening ratio was 52.5%. In contrast, in the liquid crystal display device of the present invention, as illustrated in FIG. 9B, the TFT 12, the signal line 17, and the scanning line 18 were not present in the display region, and the opening ratio was 72.0%. Additionally, since no glass substrates were stacked in this structure, the viewing angle also was broader than that of the conventional device. That is, the liquid crystal display device of the present invention has a high opening ratio per pixel and hence can realize a bright reflection display device.

Assuming the light utilization is 90% when factors such as the transmittance of the liquid crystal and the transmittance of the transparent electrode are taken into account, in the conventional liquid crystal display device shown in FIG. 9A the reflectance is 48% and a dark display results. In the liquid crystal display device of the present invention shown in FIG. 9B, on the other hand, the reflectance is 65% and a display close to paper white can be achieved. Note that the reflectance to this extent is obtained in this embodiment because the pixel pitch is a 100-μm side square, but the reflectance improves as the pixel pitch is increased.

In this embodiment, a three-layered structure of cyan, magenta, and yellow has been described. It is, however, also possible to form a four-layered structure by adding a black opaque liquid crystal layer to the three-layered structure. With this structure it is possible to display more vivid black.

Embodiment 2

FIG. 10 is a schematic view showing another embodiment of the liquid crystal display device of the present invention. This liquid crystal display device has a structure in which a shield electrode 22 of a fixed potential is formed below (on the side of a glass substrate 11) a reflecting plate (pixel electrode) 13 and thereby the capacitive coupling between the pixel electrode 13 and a signal line, a gate line, and a TFT is reduced. Cs capacitances 23 can also be formed between this shield electrode 2 and the pixel electrode 13 and pixel electrodes 15.

Since the shield electrode 22 is formed, various electric circuits can be formed below the shield electrode 22. The presence of the shield electrode 22 prevents, e.g., the capacitive coupling between the pixel electrodes and the electric circuits.

Embodiment 3

FIG. 11 is a schematic view showing still another embodiment of the liquid crystal display device of the present invention. This liquid crystal display device has a structure in which a reflecting plate (pixel electrode) 13 is formed by a shield electrode 22 of a fixed potential. Similar to the liquid crystal display device of the second embodiment, this liquid crystal display device also can reduce the capacitive coupling between the pixel electrode and a signal line, a gate line, and a TFT. Note that Cs capacitances 23 can be formed between the shield electrode 22 and pixel electrodes 15.

Since the shield electrode 22 is formed, various electric circuits can be formed below the shield electrode 22. The presence of the shield electrode 22 prevents, e.g., the capacitive coupling between the pixel electrodes and the electric circuits.

Embodiment 4

A transparent electrode was formed by forming a reflecting plate (pixel electrode) 13 or a shield electrode 22 by using a transparent conductive material and a diffusing plate was arranged outside a glass substrate 11, thereby manufacturing a liquid crystal display device. With this structure the manufacturing steps can be simplified. For example, since the diffusing plate is externally attached, it is unnecessary to coarsen the surface of the reflecting electrode in order to improve the diffusion characteristic. Also, by placing a back light instead of this diffusing plate it is possible to use this guest-host liquid crystal cell as both transmissive and reflective liquid crystal cells. When this liquid crystal display device was used as a transmissive liquid crystal display device, the light utilization was higher (about three times) than that of a transmissive liquid crystal display device using a conventional color filter.

Embodiment 5

Following the same procedure as illustrated in FIGS. 8A to 8E, TFTs 12 are formed on a glass substrate 11, an insulating film 20 is formed, and through holes 21 are formed in it. Copper plating columns 19 are formed in these through holes 21, the surface is planarized, and a reflecting plate 13 is formed. Additionally, a transparent electrode layer 15 is formed.

Subsequently, a resist is applied on the surface and dried to form a resist layer. This resist layer is exposed and developed through a mask, thereby forming holes by leaving the resist layer behind in a portion except regions in which copper plating columns are to be formed. Copper electroplating is then performed to grow copper plating columns in these holes. Thereafter, the resist layer is removed and, in the same fashion as in the first embodiment, a yellow liquid crystal layer 14a, a magenta liquid crystal layer 14b, and a cyan liquid crystal layer 14c are formed in this order.

In this embodiment, the steps of forming through holes in the liquid crystal layers 14a to 14c can be omitted. Consequently, it is possible to prevent, e.g., deterioration of the liquid crystal layers caused by an etching process for forming through holes, and this improves the manufacturing yield. Furthermore, reducing the manufacturing steps achieves a low cost.

Embodiment 6

Following the same procedure as in the first embodiment, TFTs 12 are formed on a glass substrate, and a reflecting electrode 13 is so formed as to contact one TFT 12. This reflecting plate (pixel electrode) 13 is formed by a method similar to a method of forming gate lines or signal lines. A transparent electrode can also be formed instead of the reflecting plate 13. Thereafter, in accordance with the steps shown in FIGS. 8F to 8J, liquid crystal layer formation, through hole formation, copper electroplating, and planarization are repeated to form liquid crystal layers 14a to 14c. This method can greatly reduce the reflecting plate formation steps and thereby can greatly improve the yield and the productivity. The liquid crystal display device manufactured by this method has a structure illustrated in FIG. 12. As in FIG. 12, this structure has no insulating film 20, and the elements are formed by thin films.

Figure 13:
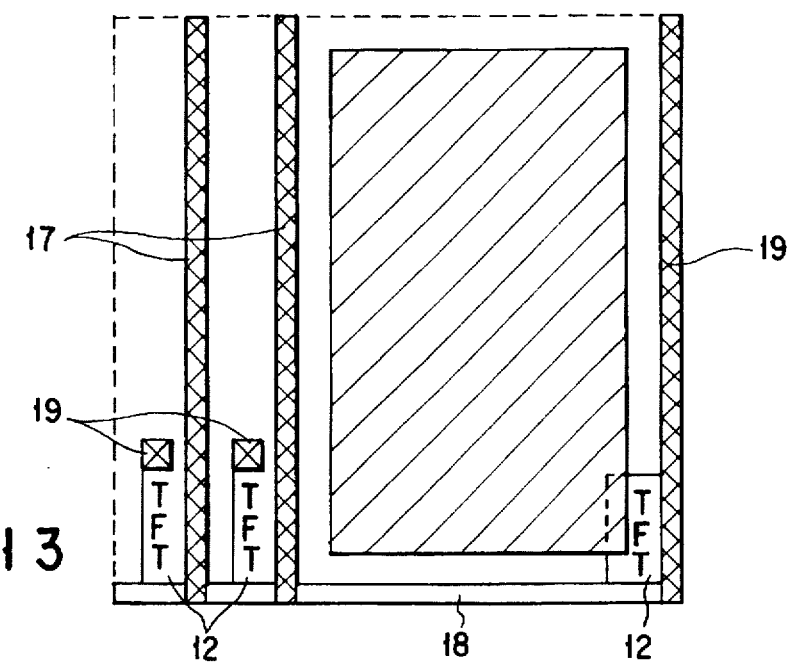
FIG. 13 is a plan view of the liquid crystal display device shown in FIG. 12.

FIG. 13 is a plan view of the liquid crystal display device shown in FIG. 12. As in FIG. 13, a reflecting plate 13 and a TFT are formed, and TFTs (two in FIG. 13) to be connected to transparent electrode layers 15 formed above the reflecting plate (pixel also are formed. This structure is particularly effective when the pixel pitch is relatively large, 200 μm or more, since the opening ratio decreases little due to non-display regions such as interconnecting lines and TFTs, and a sufficient reflectance also can be obtained.

Embodiment 7

Figure 14A:
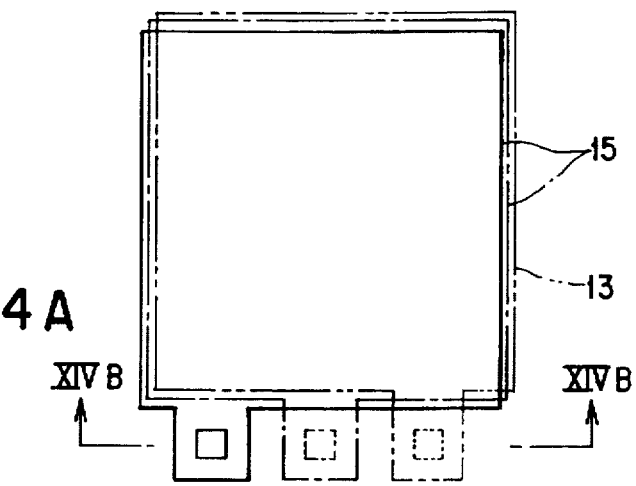
FIGS. 14A and 16 are sectional views showing still another embodiment of the liquid crystal display device of the present invention.
Figure 14B:
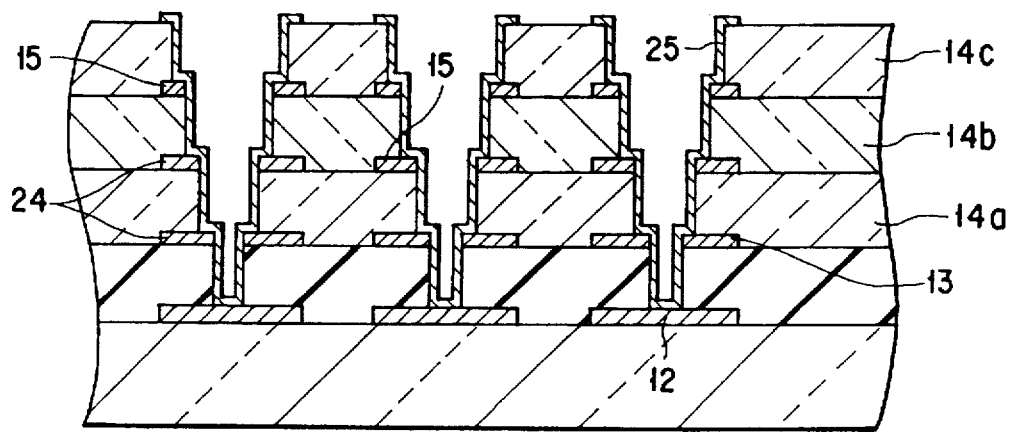
FIG. 14B is a sectional view taken along the line XIVB-XIVB' in FIG. 14A.

In this embodiment, a structure in which pixel electrodes and TFTs are connected without forming any copper plating column will be described below. FIG. 14A is a plan view showing the liquid crystal display device according to this embodiment. FIG. 14B is a sectional view of an electrode contact portion taken along the line XIVB–XIVB' in FIG. 14A. As shown in FIG. 14B, in this structure liquid crystal layers 14a to 14c and TFTs are electrically connected only via a conductive layer 25. Therefore, dummy conductive patterns 24 are formed in the end portions of the liquid crystal layers 14a to 14c.

In the manufacture of the liquid crystal display device with this structure, TFTs 12 are formed on a glass substrate 11, an insulating film 20 is formed on the TFTs 12, and pixel electrode formation, dummy conductive pattern formation, and liquid crystal layer formation are repeatedly performed. Subsequently, as illustrated in FIG. 15A, a resist is applied and dried on the cyan liquid crystal layer 14c to form a resist layer, and this resist layer is exposed and developed through a mask, thereby forming a hole by leaving the resist layer behind in a portion except a region in which a through hole is to be formed. Dry etching is performed for the resultant structure. Since the pixel electrodes and the dummy electrode patterns are not etched, a stepwise through hole is formed as shown in FIG. 15B. Thereafter, as illustrated in FIG. 15C, a conductive layer 25 is formed by coating a conductive paste of, e.g., Ag or Cu, or by performing sputtering or evaporation of a metal such as aluminum or a conductive metal oxide such as ITO. Finally, this conductive layer 25 is patterned into a predetermined shape.

In the method of this embodiment, the pixel electrodes and the TFTs can be connected without using copper electroplating. Additionally, a plurality of liquid crystal layers can be electrically connected by a single connecting step. This greatly reduces the number of manufacturing steps, improves the productivity, and decreases the production cost.

Embodiment 8

Figure 16:
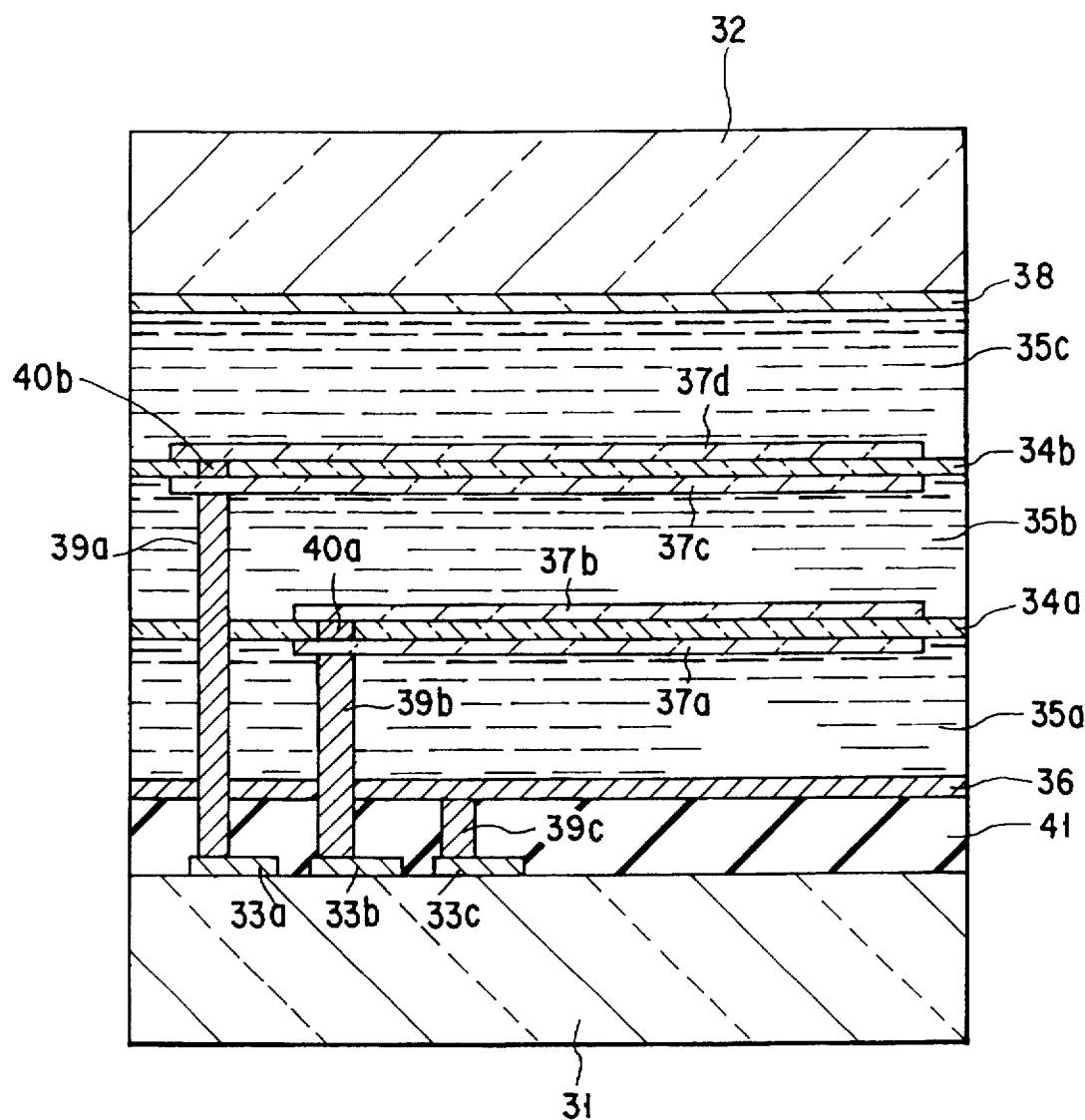

FIG. 16 shows a host-guest liquid crystal display device of a three-layer structure according to still another embodiment of the present invention. In this device, intermediate substrates 34a and 34b each consisting of a glass substrate or a transparent polymer film are disposed apart from each other within a liquid crystal cell to form three separate liquid crystal layers, i.e., a yellow liquid crystal layer 35a, a magenta liquid crystal layer 35b and a cyan liquid crystal layer 35c. Transparent electrode layers 37a and 37b each made of ITO are formed on both surfaces of the intermediate substrate 34a. Likewise, transparent electrode layers 37c and 37d each made of ITO are formed on both surfaces of the intermediate substrate 34b.

As seen from FIG. 16, TFT's 33a, 33b and 33c are formed on the inner surface of a glass substrate 31. Further, a reflecting plate 36, the intermediate substrates 34a, 34b, and a counter glass electrode 32 are arranged apart from each other above the glass substrate 31 in the order mentioned. A transparent electrode layer 38 made of ITO is formed on the inner surface of the counter glass substrate 32.

The TFT 33b is electrically connected via a plating column 39a to the transparent electrode layers 37a, 37b formed on both surfaces of the intermediate substrate 34a. Likewise, the TFT 33a is electrically connected via a plating column 39b to the transparent electrode layers 37c, 37d formed on both surfaces of the intermediate substrate 34b. Further, the TFT 33c is electrically connected to the reflecting plate 36 via a plating column 39c. It should be noted that these plating columns 39a, 39b are connected to the transparent electrode layers 37a, 37b, 37c, 37d via through holes 40a and 40b formed in the intermediate substrates 34a and 34b, respectively.

Signal lines (not shown) and gate lines (not shown) formed on the glass substrate 31 are connected to the TFT's 33a, 33b, 33c, with the result that an image information can be transmitted to each pixel by the principle of an active matrix type liquid crystal display device. It should also be noted that the intermediate substrates 34a, 34b, and the plating columns 39a, 39b are supported by spacers (not shown) so as to provide a predetermined gap between the glass substrate 31 and the counter glass substrate 32.

An insulating film 41 is interposed between the glass substrate 31 and the reflecting plate 36. The yellow liquid crystal layer 35a referred to previously is interposed between the reflecting plate 36 and the intermediate substrate 34a. The magenta liquid crystal layer 35b referred to previously is interposed between the intermediate substrates 34a and 34b. The cyan liquid crystal layer referred to previously is interposed between the intermediate substrate 34b and the counter glass substrate 32. The order of arrangement of these liquid crystal layers 35a, 35b and 35c need not be restricted to that described above.

The liquid crystal display device constructed as described above produces excellent effects similar to those produced by the devices of the other embodiments described previously.

The embodiments described above are based mainly on a host-guest liquid crystal mode. However, the technical idea of the present invention can also be applied to, for example, a selective reflection mode using a choloesteric liquid crystal.

As has been described above, the liquid crystal display device of the present invention comprises a reflecting plate formed above a substrate, and a liquid crystal cell formed by repetitively, sequentially stacking a liquid crystal layer and a transparent electrode layer at least once on the reflecting plate. The liquid crystal layer is constituted by a guest-host liquid crystal containing dye molecules and liquid crystal molecules. Active elements for controlling potential information to be supplied to all transparent electrodes and interconnecting lines are formed on the substrate. The transparent electrode and the active elements are electrically connected. The liquid crystal display device with this structure has a high reflectance and a high opening ratio and can perform a good color display.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A liquid crystal display device, comprising:
   a substrate;
   a reflecting plate formed above said substrate; and
   a liquid crystal cell including a plurality of liquid crystal layers and a plurality of transparent electrode layers, said liquid crystal layers and said transparent electrode layers being alternately disposed to form a stacking structure above said reflecting plate,
   wherein active elements for controlling a potential information given to all the transparent electrode layers are formed on said substrate, and each transparent electrode layer is electrically connected to said active elements.

2. The liquid crystal display device according to claim 1, wherein said liquid crystal layer is formed of guest-host liquid crystal material containing dye molecules and liquid crystal molecules.

3. The liquid crystal display device according to claim 2, wherein said liquid crystal layer is formed of a thin film having said guest-host liquid crystal material microencapsulated therein.

4. The liquid crystal display device according to claim 1, wherein said liquid crystal layer contains a selective reflection mode liquid crystal material.

5. The liquid crystal display device according to claim 1, wherein a stacking structure comprises a first liquid crystal layer, a first transparent electrode layer, a first transparent insulating layer, a second transparent electrode layer, a second liquid crystal layer, a third transparent electrode layer, a second transparent insulating layer, a fourth transparent electrode layer, and a third liquid crystal layer, said first transparent electrode layer being electrically connected to said second transparent electrode layer, and said third transparent electrode layer being electrically connected to said fourth transparent electrode layer.

6. The liquid crystal display device according to claim 1, wherein said reflecting plate further serves as a shield plate and is supplied with a fixed potential from a fixed potential source.

7. The liquid crystal display device according to claim 1, wherein an insulating film is provided between the substrate and the reflecting plate.

8. The liquid crystal display device according to claim 1, wherein the active elements are provided on a portion of the substrate beneath the reflecting plate.

9. A liquid crystal display device comprising:
   a substrate;
   a reflecting plate formed above said substrate;
   a liquid crystal cell formed by stacking at least one liquid crystal layer and at least one transparent electrode layer on said reflecting plate; and
   active elements formed on said substrate and electrically connected to the reflecting layer and to the at least one transparent electrode layer for supplying voltage potentials to the reflecting layer and to the at least one transparent electrode layer,
   wherein said at least one liquid crystal layer includes a thin film having a microcapsulated guest-host liquid crystal containing dye molecules and liquid crystal molecules.

10. The liquid crystal display device according to claim 9, wherein a plurality of liquid crystal layers and transparent electrode layers are alternately stacked on said reflecting plate.

11. The liquid crystal display device according to claim 9, wherein three transparent electrode layers and three liquid crystal layers are alternately stacked on said reflecting plate, and colors of said liquid crystal layers correspond to cyan, magenta, and yellow.

12. The liquid crystal display device according to claim 11, wherein there are three active elements formed on said substrate and electrically connected to one scanning line.

13. The liquid crystal display device according to claim 9, wherein four transparent electrode layers and four liquid crystal layers are alternately stacked on said reflecting plate, and colors of said liquid crystal layers correspond to cyan, magenta, yellow, and black.

14. The liquid crystal display device according to claim 9, wherein said transparent electrode layer and said active elements are electrically connected by a plating layer.

15. The liquid crystal display device according to claim 9, wherein said reflecting plate is an electrode.

16. The liquid crystal display device according to claim 9, wherein said transparent electrode layer and said active elements are electrically connected by one material selected from the group consisting of a conductive paste, a metal deposition film, a metal sputtering film, a conductive metal oxide deposition film, and a conductive metal oxide sputtering film.

17. The liquid crystal display device according to claim 9, wherein a diameter of microcapsules constituting said liquid crystal layer is not more than a cell gap.

18. The liquid crystal display device according to claim 9, wherein a thickness of said thin film is 5 to 15 $\mu$m.

19. The liquid crystal display device according to claim 9, wherein said microcapsulated guest-host liquid crystal contains an additional polymer as a microcapsulating agent.

20. The liquid crystal display device according to claim 9, wherein the liquid crystal cell has at least three different color liquid crystal layers having different color dye molecules alternately stacked with at least two transparent electrode layers.

21. The liquid crystal display device according to claim 20, wherein the active elements supply two different alternating voltage potentials to the reflecting plate and the at least two transparent electrode layers to selectively switch the at least three different color liquid crystal layers between a mode causing light transmission through a given liquid crystal layer and a mode causing light absorption by a given liquid crystal layer to control a color being displayed by the liquid crystal display device.

22. The liquid crystal display device according to claim 21, wherein one of the at least three different color liquid crystal layers is cyan colored, one of the at least three different color liquid crystal layers is magenta colored, and one of the at least three different color liquid crystal layers is yellow colored.

23. The liquid crystal display device according to claim 21, wherein the active elements supply different alternating voltage potentials in a range from +V to −V to the reflecting plate and the at least two transparent electrode layers to selectively switch the at least three different color liquid crystal layers between a mode causing light transmission through a given liquid crystal layer and at least two absorption modes causing different degrees of light absorption by a given liquid crystal layer to control a color being displayed by the liquid crystal display device.

24. The liquid crystal display device according to claim 23, wherein one of the at least three different color liquid crystal layers is cyan colored, one of the at least three different color liquid crystal layers is magenta colored, and one of the at least three different color liquid crystal layers is yellow colored.

25. The liquid crystal display device according to claim 9, wherein the reflecting plate is in direct electrical contact with one of the active elements.

26. The liquid crystal display device according to claim 9, wherein the reflecting plate is provided with a roughened surface to provide a predetermined degree of reflective light diffraction.

27. The liquid crystal display device according to claim 9, wherein the at least one liquid crystal layer and the at least one transparent electrode layer are in direct contact.

28. The liquid crystal display device according to claim 9, wherein an insulating film is provided between the substrate and the reflecting plate.

29. The liquid crystal display device according to claim 9, wherein the active elements are provided on a portion of the substrate beneath the reflecting plate.

30. A liquid crystal display device comprising:

a substrate;

a reflecting plate formed above said substrate;

a liquid crystal cell formed by stacking at least one liquid crystal layer and at least one transparent electrode layer on said reflecting plate;

wherein said at least one liquid crystal layer includes a thin film comprised of a microcapsulated guest-host liquid crystal containing dye molecules and liquid crystal molecules; and a shield electrode formed between said substrate and said reflecting plate, said shield electrode being provided with a fixed potential from a source of fixed potential.

31. The liquid crystal display device according to claim 30, wherein an insulating film is provided between the substrate and the reflecting plate.

32. The liquid crystal display device according to claim 30, wherein active elements are provided on said substrate and electrically connected to the reflecting layer and to the at least one transparent electrode layer.

33. The liquid crystal display device according to claim 32, wherein the active elements are provided on a portion of the substrate beneath the shield electrode formed between the substrate and the reflecting plate.

34. A liquid crystal display device comprising:

a substrate;

a reflecting plate electrode formed above said substrate;

a liquid crystal cell formed by stacking at least one liquid crystal layer and at least one transparent electrode layer on said reflecting plate electrode;

wherein said at least one liquid crystal layer includes a thin film comprised of a microcapsulated guest-host liquid crystal containing dye molecules and liquid crystal molecules; and wherein said reflecting plate electrode serves as a shield electrode which is provided with a fixed potential from a source of fixed potential.

35. The liquid crystal display device according to claim 34, wherein an insulating film is provided between the substrate and the reflecting plate.

36. The liquid crystal display device according to claim 34, wherein active elements are provided on said substrate and electrically connected to the reflecting layer and to the at least one transparent electrode layer.

37. The liquid crystal display device according to claim 36, wherein the active elements are located on a portion of the substrate beneath the reflecting plate.

38. A method of driving a liquid crystal display device, said device comprising a substrate, a reflecting plate formed above said substrate, a liquid crystal cell including a plurality of liquid crystal layers and a plurality of transparent electrode layers, said liquid crystal layers and said transparent electrode layers being alternately disposed to form a stacked structure above the reflecting plate, and substrate supported active elements mounted below the reflecting plate and electrically connected to the reflecting plate and the transparent electrode layers, comprising the steps of:

applying at least two different alternating voltage levels to said reflecting plate; and applying said at least two different alternating voltages to said transparent electrode layers, wherein the order in which the two different voltages are applied to the reflecting electrode and the transparent electrode layers is different to create different display effects.

39. The method according to claim 38, wherein the different display effects result from the steps of applying the at least two different alternating voltages and an associated condition wherein a transmittance or a reflectance of liquid crystal molecules and dye molecules contained in said liquid crystal layers becomes a maximum or a minimum with respect to incident light in a direction substantially perpendicular to a surface of said reflecting plate or of said transparent electrode layers.

* * * * *